(12) United States Patent
Chakravarthi et al.

(10) Patent No.: US 11,047,705 B2
(45) Date of Patent: Jun. 29, 2021

(54) PREDICTIVE NAVIGATION SYSTEM

(71) Applicant: INTERNATIONAL BUSINESS MACHINES CORPORATION, Armonk, NY (US)

(72) Inventors: Divya Kannan Chakravarthi, Wappingers Falls, NY (US); Kriteshwar K. Kohli, White Plains, NY (US); Vinod A. Valecha, Pune (IN); John A. Lyons, Ottawa (CA)

(73) Assignee: International Business Machines Corporation, Armonk, NY (US)

(*) Notice: Subject to any disclaimer, the term of this patent is extended or adjusted under 35 U.S.C. 154(b) by 5 days.

(21) Appl. No.: 16/510,362

(22) Filed: Jul. 12, 2019

(65) Prior Publication Data

US 2021/0010821 A1    Jan. 14, 2021

(51) Int. Cl.
| | |
|---|---|
| *G01C 21/36* | (2006.01) |
| *G06F 16/29* | (2019.01) |
| *G06F 3/01* | (2006.01) |
| *G08B 21/02* | (2006.01) |
| *G01C 21/34* | (2006.01) |
| *G06T 19/00* | (2011.01) |

(52) U.S. Cl.
CPC ....... *G01C 21/365* (2013.01); *G01C 21/3407* (2013.01); *G06F 3/011* (2013.01); *G06F 16/29* (2019.01); *G06T 19/006* (2013.01); *G08B 21/02* (2013.01); *G06F 2203/011* (2013.01)

(58) Field of Classification Search
None
See application file for complete search history.

(56) References Cited

U.S. PATENT DOCUMENTS

| | | |
|---|---|---|
| 2013/0009777 A1 | 1/2013 | Aarts et al. |
| 2014/0171039 A1 | 6/2014 | Bjontegard |
| 2015/0348396 A1 | 12/2015 | Sattari |
| 2017/0193705 A1* | 7/2017 | Mullins ................. G06T 19/006 |
| 2017/0370736 A1 | 12/2017 | Singh |

OTHER PUBLICATIONS

Mell et al., "The NIST Definition of Cloud Computing", Recommendations of the National Institute of Standards and Technology, NIST Special Publication 800-145, Sep. 2011, 7 pages.
Evegard et al., "Augmented Reality Navigation Interfaces Designed for People with Mild Dementia", Examensarbete Inom Teknik, Grundniva, 15 HP, Stockholm, Sverige 2018, 15 pages.

(Continued)

*Primary Examiner* — Nurun N Flora
(74) *Attorney, Agent, or Firm* — James W. Kappos (57) ABSTRACT

A method, computer system, and a computer program product for providing a personalized anxiety-reducing navigation system for a user utilizing augmented reality (AR) and virtual reality (VR) is provided. The present invention may include detecting a current location of the user. The present invention may then include, in response to detecting the current location of the user is beyond a comfort boundary threshold, determining a stress state of the user. The present invention may also activate an AR system. The present invention may further, in response to determining the determined stress state of the user is high, activate a VR system.

18 Claims, 5 Drawing Sheets

(56) References Cited

OTHER PUBLICATIONS

Hermsdorfer et al., "Augmented Reality in Rehabilitation", Therapy Lens, printed on Jul. 12, 2019, 5 pages.
Swaney, "Virtual Reality Delivers Real-World Benefits to Dementia Patients", Samsung, Mar. 13, 2018, 5 pages.
Statista, Forecast augmented (AR) and virtual reality (VR) market size worldwide from 2016-2023 (in billion U.S. dollars), printed on Jul. 12, 2019, 1 page.
Matney, "Phiar raises $3 million for an AR navigation app for drivers", TechCrunch, Nov. 28, 2018, 2 pages.
Liptak, "Google is letting some users test its AR navigation feature for Google Maps", the Verge, Feb. 10, 2019, 2 pages.
Virtue Health, "LookBack:Virtual Therapy for Dementia", printed Jul. 12, 2019, 2 pages.
Gstoll, "Wikitude Navigation", printed on Jul. 12, 2019, 2 pages.

\* cited by examiner

PREDICTIVE NAVIGATION SYSTEM

BACKGROUND

The present invention relates generally to the field of computing, and more particularly to personal navigation.

Traditional methods to navigate the general population of people to a particular requested location (e.g. home, work) have generally proved successful. These traditional methods of navigation, however, may fail to successfully navigate people, who are affected with a diagnosed medical condition (e.g., anxiety).

SUMMARY

Embodiments of the present invention disclose a method, computer system, and a computer program product for providing a personalized anxiety-reducing navigation system for a user utilizing augmented reality (AR) and virtual reality (VR) is provided. The present invention may include detecting a current location of the user. The present invention may then include, in response to detecting the current location of the user is beyond a comfort boundary threshold, determining a stress state of the user. The present invention may also activate an AR system. The present invention may further, in response to determining the determined stress state of the user is high, activate a VR system.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, python programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for providing a personalized anxiety-reducing navigation system for a user utilizing personal navigation. As such, the present embodiment has the capacity to improve the technical field of AR and VR by utilizing AR and VR to calm affected patients. More specifically, the present invention first may detect a current location of a user. Further, in response to detecting the current location of the user is beyond a comfort boundary threshold, the present invention may determine a stress state of the user. Additionally, the prevent invention may activate an augmented reality (AR) system capable of superimposing images onto the visual field of the user. The present invention, upon detection of a high emotional state of the user, may activate a VR system to calm the user to an emotional state in which the user may continue to utilize the AR system turn-by-turn navigation.

Therefore, it may be advantageous to, among other things, implement a technique to navigate an affected user back home taking into consideration the stress state of the user using the combination of AR and VR. The stress state of user may dynamically change the system being used (AR or VR), while simultaneously relaying all data to the caregiver of the user.

According to at least one embodiment, the predictive navigation program may weigh feedback from a plurality of biometric Internet of Things (IoT) sensors, geo-positional data, and one or more cameras against a predefined threshold to determine whether the user is outside of the comfort area of the user and/or caregiver, doctor, therapist, or any other person relatively close to the user.

According to at least one embodiment, the predictive navigation program may determine the stress state of the user. In such embodiment, the predictive navigation program may use feedback from a plurality of biometric IoT sensors or data collection devices to determine the overall stress state of the user.

With reference to at least one embodiment, the predictive navigation program may alert the caregiver when such user is beyond the predefined comfort boundary (i.e. comfort boundary threshold). In such embodiment, the caregiver may have access to a dynamic live feedback and monitoring stream of the user.

According to at least one embodiment, the predictive navigation program may superimpose historical images of neighborhoods and other images from caregivers when providing navigation. In such embodiments, caregivers may remotely access the predictive navigation program and the computing device to allow users to gather a sense of direction and comfort. Superimposed images may utilize an augmented reality (AR) device or a virtual reality (VR) device (e.g., headset, glasses).

In at least one embodiment, the predictive navigation program may provide turn-by-turn AR navigation and personalized content to the user of the computing device. In such embodiment, the predictive navigation program may detect and change an emotional state associated with the user to calm the affected population and allow for the user to arrive at the particular location safely.

According to at least one embodiment, the predictive navigation program may activate a VR system when a high emotional state of the user is detected. In such embodiments, the predictive navigation program may detect, when the user of the computing device, is experiencing an elevated level of stress. Upon such detection, the predictive navigation program may present to the user a new less anxiety-triggering environment.

Figure 1:
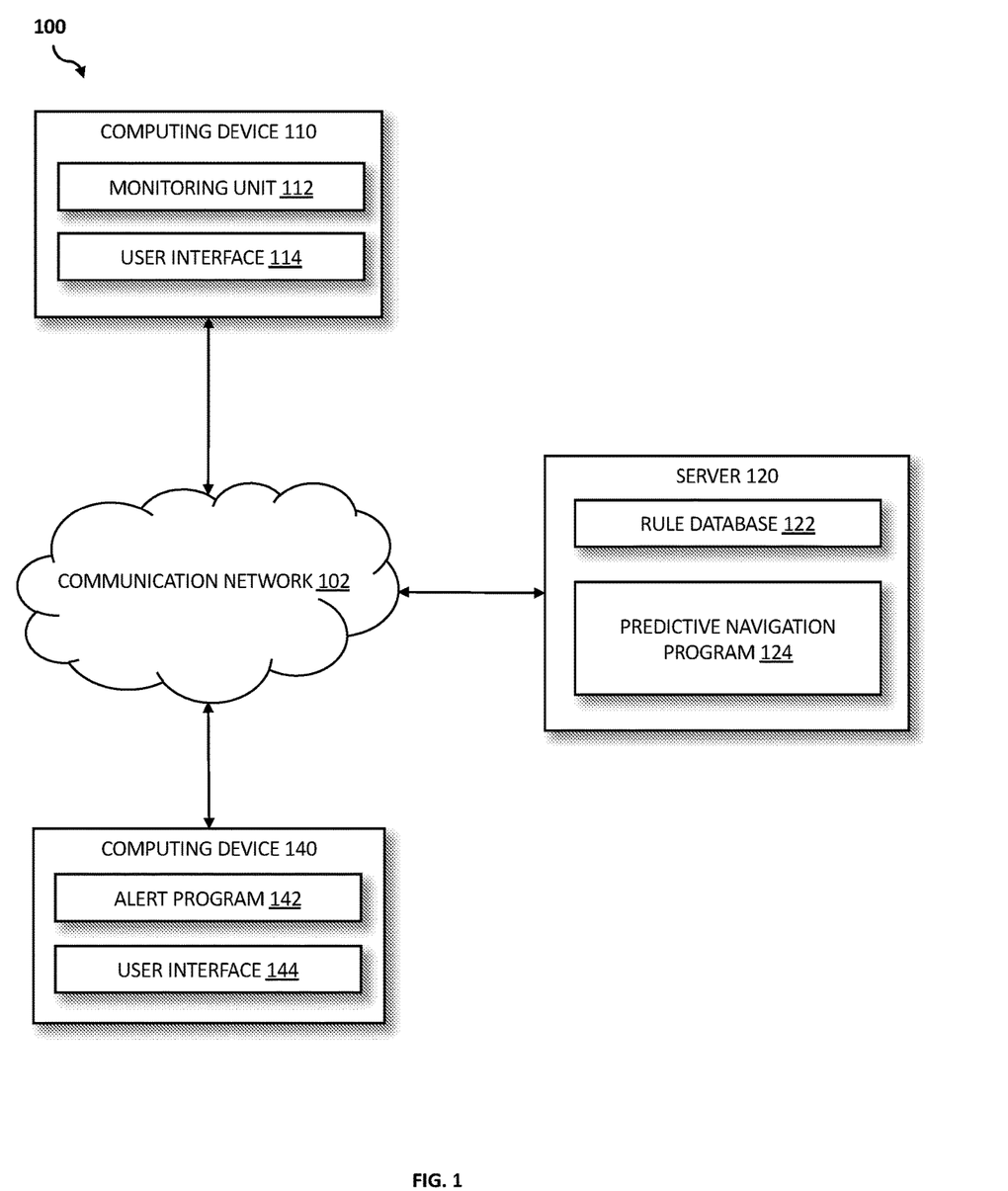
FIG. 1 illustrates a networked computer environment 100 according to at least one embodiment.

Referring to FIG. 1, an exemplary networked computer environment 100 is accordance with one embodiment is depicted. The networked computer environment 100 may include a computing device 110, a server 120, and a computing device 140, interconnected via a communication network 102. While, in the example embodiment, programming and data of the present invention are stored and accessed remotely across several servers via the communication network 102, in other embodiments, programming and data of the present invention may be stored locally on as few as one physical computing device or amongst other computing devices than those depicted.

In the example embodiment, the communication network 102 is a communication channel capable of transferring data between connected devices. In the example embodiment, the communication network 102 may be the Internet, representing a worldwide collection of networks and gateways to support communications between devices connected to the Internet. Moreover, the communication network 102 may include, for example, wire, wireless, or fiber optic connections which may be implemented as an intranet network, a wide area network (WAN), a local area network (LAN), a telecommunication network, a wireless network, a public switched network, a satellite network, or any combination thereof. In general, the communication network 102 may be any combination of connections and protocols that will support communications between the computing device, the server 120, and the computing device 140. It should be appreciated that FIG. 1 provides only an illustration of one implementation and does not imply any limitations with regard to the environments in which different embodiments may be implemented. Many modifications to the depicted environments may be made based on design and implementation requirements.

In the example embodiment, the computing device 110 includes a monitoring unit 112 and a user interface 114, and may be a server, a laptop computer, a netbook computer, a personal computer (PC), a desktop computer, a server, a personal digital assistant (PDA), a rotary phone, a touchtone phone, a smart phone, a mobile phone, a virtual device, a thin client, or any other electronic device or computing system capable of receiving and sending data to and from other computing devices. While, in the example embodiment, the computing device is shown as a single device, in other embodiments, the computing device 110 may be comprised of a cluster or plurality of computing devices, working together or working separately. In various embodiments, the networked computer system 100 may include one or more of the computing device 110, wherein a user of the computing device 110 may send data to the server 120, or the computing device 140.

In the example embodiment, the monitoring unit 112 may be comprised of a combination of devices, subsystems, or modules wherein the combination of these devices measure events or detect change in the environment in which the device is being used. The monitoring unit 112 may be comprised of, but is not limited to, biometric IoT sensors, geo-positional sensors, auditory detectors (i.e. microphones), motion sensors, cameras, barometers, magnetometers, or accelerometers. In embodiments, the monitoring unit 112 may communicate with other devices in the networked computer environment 100 to transfer data and command programs to run. In the example embodiment, the data from the monitoring unit 112 may be stored locally on the computing device 110. In other embodiments, the data collected may be stored remotely and accessed via the communication network 102. In the example embodiment, the monitoring unit 112 may be used to detect the physiological state of the user (i.e. blood pressure, heartrate).

In the example embodiment, the user interface 114 allows the user of the computing device 110 to interact with the internal process of the computing device 110 and its communication capabilities via the communication network 102. In general, the user interface 144 is used to obtain and transfer input data manually input from a user.

In the example embodiment, the server 120 includes a database 122, and a predictive navigation program 124, and is a device that is capable of communicating with the computing device 110, and the computing device 140 via the communication network 102. As will be discussed with reference to FIG. 4, the server 120 may include internal components 902 and external components 904a, respectively. The server 120 may also operate in a cloud computing service model, such as Software as a Service (SaaS), Analytics as a Service (AaaS), Platform as a Service (PaaS), or Infrastructure as a Service (IaaS). The server 120 may also be located in a cloud computing deployment model, such as a private cloud, community cloud, public cloud, or hybrid cloud.

In the example embodiment, the database 122 is a collection of files including, but not limited to, HTML files, CSS files, XML files, and JavaScript files. In general, the database 122 is comprised of rules (i.e. alert caretaker when the user enters a park) and thresholds set by the caregiver (e.g., alert caregiver when the user goes farther than 5 miles from home address) in addition to user profile data (i.e. user profile, profile data) and historic images. Profile data may include the user's name, age, gender, home address, defined threshold, emergency contacts, primary clinician(s), and a physical description. Historic images may be defined as the combination of historic artifacts and historic environments. Historic artifacts may be defined as objects that may be superimposable using augmented reality (AR), and may include antique houses, old fashioned vehicles, old fashioned street technology (e.g., removal of street lights), old street lamps, brick roads, pedestrians with old fashioned styles, or modified road signs. Historic environments may be defined as the complete three-dimensional model used for virtual reality (VR). In the example embodiment, the database 122 may be updated and added to by the computing device 110, the computing device 140, or the combination thereof via the communication network 102.

In the example embodiment, the predictive navigation program 124 is a software program capable of receiving data from the computing device 110, 140, or the server 140. In the example embodiment, the predictive navigation program 124 may receive data specifically about the user's physiological state from the monitoring unit 112. In addition, the predictive navigation program 124 is further capable of compiling physiological data of the user via the monitoring unit 112, processing the data, and determining the stress state of the user of the computing device 110. Such software is also capable of providing turn-by-turn directions back to a certain location. Furthermore, the navigation program 126 is capable of adjusting the visual field of the user of the computing device through implementation of both augmented reality as well as virtual reality.

In the example embodiment, the computing device 140 contains an alert program 142 and a user interface 144 and may be a server, a laptop computer, a netbook computer, a personal computer (PC), a desktop computer, a server, a personal digital assistant (PDA), a rotary phone, a touchtone phone, a smart phone, a mobile phone, a virtual device, a thin client, or any other electronic device or computing system capable of receiving and sending data to and from other computing devices. While, in the example embodiment, the computing device is shown as a single device, in other embodiments, the computing device 140 may be comprised of a cluster or plurality of computing devices, working together or working separately. In various embodiments, the networked computer system 100 may include one or more of the computing device 110, wherein a user of the computing device 140 may send data to the server 120, or the computing device 110.

In the example embodiment, the alert program 142 is a software program capable of receiving data from the computing device 110, 140, and the server 120. Moreover, the alert program 142 is used to alert the caregiver when the patient is anxious, has lost a sense of direction, or has gone beyond the threshold set by the caregiver, medical professional, therapist, or patient themselves. Additionally, the alert program 142 is further capable of alerting the caregiver that a threshold has automatically been set for the user due to the lack of user profile data and a predefined threshold.

In the example embodiment, the user interface 144 allows the user of the computing device 140 to interact with the internal processor of the computing device 110 and its communication capabilities via the communication network 102. In general, the user interface 144 is used to obtain and transfer input data manually input from a user.

It should be appreciated that FIG. 1 provides only an illustration of one implementation and does not imply any limitations with regard to the environments in which different embodiments may be implemented. Many modifications to the depicted environments may be made based on design and implementation requirements.

Figure 2:
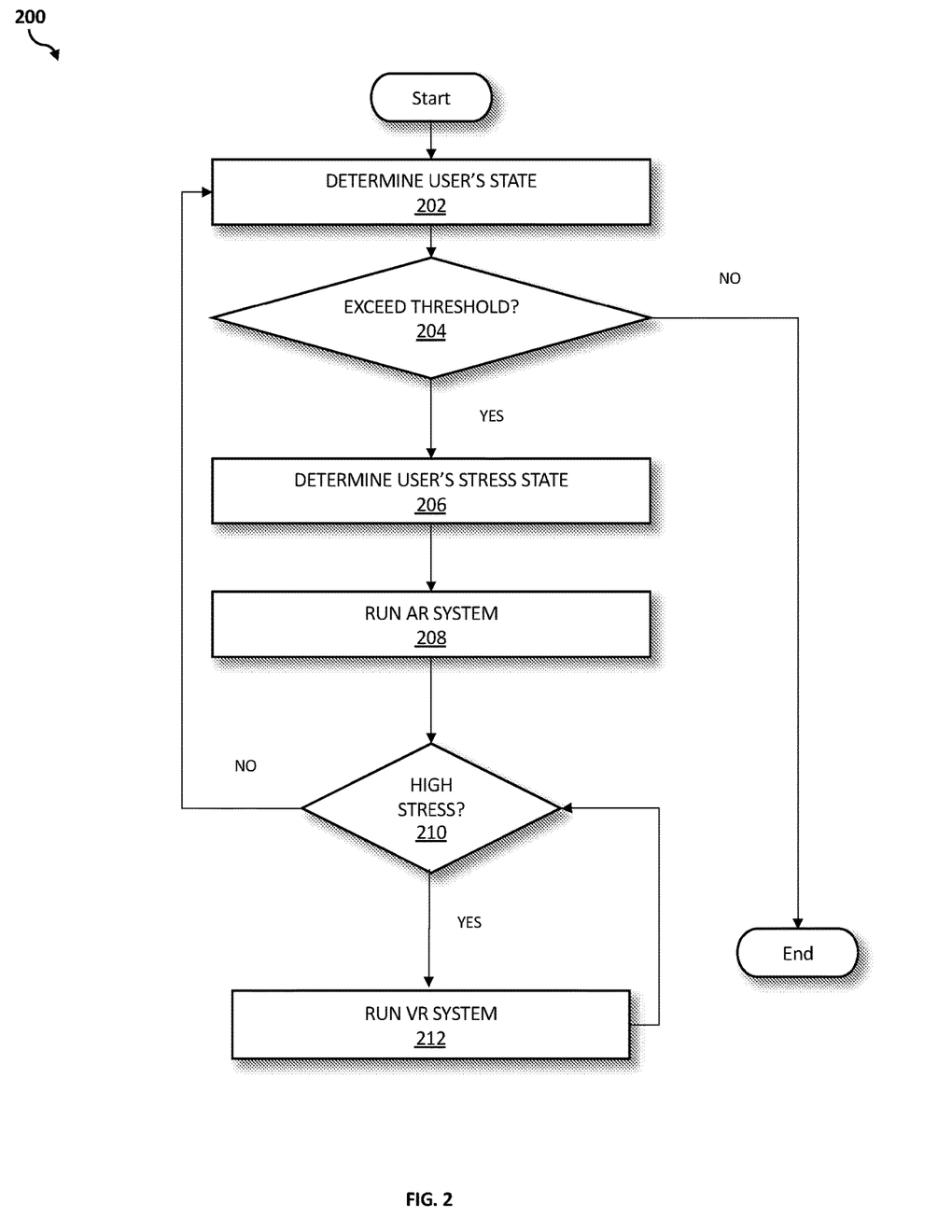
FIG. 2 is an operational flowchart illustrating a process for a predictive navigation program according to at least one embodiment.

Referring now to FIG. 2, an operational flowchart 200 illustrates the operations of the predictive navigation program 124 of the networked computer system 100, according to at least one embodiment.

At 202, the user state is determined. In at least one embodiment, the predictive navigation program 124 may receive feedback from the monitoring unit 112 of the computing device 110. In such embodiment, the computing device 110 may be a wearable device with augmented and/or virtual reality capabilities (i.e. an AR/VR headset, AR/VR glasses). In some embodiments, the monitoring unit 112 may use an AR/VR device to automatically detect biometric and locational information associated with one or more Internet of Things (IoT) devices and sensors, geo-positional detectors (e.g., a global positioning system), cameras, microphones, accelerometers, or motion sensors to collect data regarding the location of the user. In general, the user of the computing device 110 may be associated with the affected population (e.g. a person diagnosed with a medical condition).

In other embodiments, the user of the computing device 110 may manually command the predictive navigation program 124 to determine user state (i.e. state of the user) to further activate the predictive navigation program 124. Manual input may include auditory commands, the press of a button, the flip of a switch, the sliding of a bar, the turn of a dial, or the pull of a string associated with the AR/VR device. In such embodiment, data may be directly input to the computing device 110 before being communicated with the predictive navigation program 124 via the communication network 102 (i.e. a user interaction with the computing device 110 of the user). In other embodiments, data may be indirectly input to the computing device 110 before being communicated via the communication network 102 (e.g., a user interaction with the computing device 140 of the patient's caregiver).

In the example embodiment, the location of the user may then be extracted from the compiled plurality of input from the plurality of IoT devices and sensors of the monitoring unit 112.

In other embodiments, wherein the data may be manually received as input, input data may be compiled, and the location of the user may be then determined. In some embodiments, the predictive navigation program 124 may utilize of natural language processing (NLP), image recognition, image processing, or speech recognition to analyze the plurality of input data to further, determine the location of the user.

For example, User A takes a walk in the neighborhood on a Wednesday. The accelerometer of the AR/VR glasses User A is currently wearing reports that User A is speeding up. The constant feedback from the global positioning system (GPS) of the AR/VR glasses reports that User A is walking closer to the perimeter of the complex grounds of User A.

Next at 204, the predictive navigation program 124 determines whether the determined user state exceeds the defined comfort boundary threshold (i.e. threshold). In general, a threshold may be defined as the magnitude or intensity that must be exceeded for a certain reaction, phenomenon, result, or condition to occur (e.g., for the predictive navigation system 124 to determine the user state). A threshold, for example, may be defined as a specified distance (e.g., five miles from the house), any location beyond a classified "safe" list as determined by the caregiver, or any specific type of location (e.g., ice cream shops). In such embodiment, the threshold may be set after a history of interactions between the user and the caregiver, medical professional, therapist or family members, and workflow experiments with the patient to determine how different various circumstances affect the overall anxiety of the user of the computing device 110. In at least one embodiment, overall anxiety may be derived from analyzing the user's gait, gesture, facial expressions, heart rate, blood pressure, or other physical or medical related characteristics associated with the patient.

In furthering the previous example, the Caregiver A may have taken a walk with the User A on the previous Monday and noticed that when the User A walks past the gates of her living complex, a one and a half mile radius from her room, her physiological state is altered (i.e. walking faster, appearing perplexed, and has an accelerated heartrate). In such example, the Caregiver A may set the comfort boundary threshold for the predictive navigation program 124 to any distance beyond the gates of the user's complex (one and a half miles) to prevent the affected user, when walking alone in the future (e.g. Wednesday), from getting anxious and lost.

In other embodiments, overall anxiety may be determined by mental state in which the caregiver, medical professional, or therapist monitors the user to observe changes in the user's mental processes, tone of voice, eye gaze or hearing capabilities.

In at least one embodiment, the predictive navigation program 124 may identify the user's predefined threshold parsing through the database 122. User profile data, as previously mentioned, may include the user's name, age, gender, home address, defined threshold, preferred superimposed images, emergency contacts, primary clinician(s), and a physical description of said user. In some embodiments, the predictive navigation program 124 may compare the identified threshold from the database 122 on the server 140 to the previously collected user location data. In such embodiment, users with no previous data may have a threshold set for a 1-mile radius.

In furthering the previous example, the predictive navigation program 124 identifies the threshold for the User A is any location beyond the gates of the user's complex, any location beyond one and a half miles. The predictive navigation program 124 had previously identified User A, when walking alone, to have been two miles away from her house. The predictive navigation program 124 compares these two values, the threshold at one and a half miles and the User A's current location at two miles.

If the predictive navigation program 124 determines that the user location data has not exceeded the defined threshold (decision 204 "NO" branch) at 204, the predictive navigation program 124 remains inactive. Since the user has not exceeded the defined threshold, the predictive navigation program 124 may not be activated.

If, however, the predictive navigation program 124 determines that the user location data has exceeded the defined threshold (decision 204 "YES" branch) at 204, the predictive navigation program 124, at 206, determines the user's stress state. In at least one embodiment, the predictive navigation program 124 may utilize the monitoring unit 112 to obtain data about the user stress state (e.g., stress level associated with the state). The monitoring unit 112 may, in such embodiment, use AR/VR device automatic detection of biometric information associated with one or more biometric sensors, IoT devices and sensors, cameras, and microphones. Biometric sensors, in such embodiment, may detect facial expression, eye gaze, galvanic skin response, muscle activity, heart rate, blood pressure, and voice commands. IoT sensors, in such embodiment, may detect temperature of the user, proximity to an object of interest, optical images, motion, and acceleration. In the example embodiment, the predictive navigation program 124 may automatically receive input from the monitoring unit 112 of the computing device 110 via the communication network 102. In other embodiments, the predictive navigation program 124 may receive manual input from the computing device 110 or the computing device 140. Manual input may include verbal commands (e.g., "I feel as though I may have a fever."), textual commands (e.g., typing into a wearable device such as a smart watch, "My heart rate is high"), the flipping of a switch on the associated device, the pressing of a button on the associated device, the starting of an application, or the sliding of a bar against a scale on the associated device.

In the example embodiment, the predictive navigation program 124 may continuously obtain data from the monitoring unit 112 of the computing device 110 for continuous monitoring of the stress state of the user. In other embodiments, the predictive navigation program 124 may obtain data from the monitoring unit 112 based on a schedule (e.g., every five minutes). In further embodiments, the predictive navigation program 124 may obtain data from the monitoring unit 112 at random time intervals (e.g. after five minutes, then after two minutes).

In some embodiments, the predictive navigation program 124 may compile and analyze the data transferred from the computing device 110 or the computing device 140 to determine the overall stress state of the user. In such embodiment, the predictive navigation program 124 may use automatic descriptive analytics to derive the overall stress state of the user. Descriptive analytics may be defined as the preliminary stage of data processing that creates a summary of historical data (e.g., biometric information) to yield useful information (e.g., the user's stress state). In the present embodiment, the rules of analysis may be stored on the server 140 where the computing device 110, 140 utilizes the communication network 102 to transfer data for analysis. In other embodiments, the rules of analysis may be directly stored on the computing device 110, 140. In other embodiments, the predictive navigation program 124 may use manual input from the user of the computing device 110 or the computing device 140 (i.e. the patient, the caregiver). Manual input may include verbal expression of stress state (e.g., "I am very anxious right now"), the push of a button on the computing device 110, 140, the flip of a switch, or the turn of a dial (e.g., 0 being not anxious and 10 being very anxious).

Continuing the previous example, the predictive navigation program 124 determines that such User A is outside the comfort boundary threshold predefined by the caregiver. The predictive navigation program 124 then receives input from the monitoring unit 112 on the AR/VR glasses of the user to detect that the user appears extremely perplexed, has a fast heart rate above 100 bpm, and has stopped moving, facing several different directions in sequence. The predictive navigation program 124 determines the User A to be extremely stressed.

Then, at 208, the augmented reality (AR) navigation system is run. In at least one embodiment, the predictive navigation program 124 may superimpose images on the visual field of the user, while providing step-by-step navigation. In general, the predictive navigation program 124 may calm down the patient while directing the patient back to a safe place. In some embodiments, the caregiver of the computing device 140 may first be alerted that the user of the computing device has triggered the AR navigation system. Alerts to the alert program 142 of the computing device 140 from the predictive navigation program 124 of the server 120 may be transferred through the communication network 102. In such embodiment, once the AR navigation system has begun, the predictive navigation program 124 may provide continuous live feedback and monitoring to the user of the alert program 142 of the computing device 140 (i.e. the caregiver) via the communication network 102. The predictive navigation program 124, in such embodiment, may utilize the monitoring unit 112 of the computing device 110 to capture information about the current state of the user, and then to transmit to the alert program 142 of the computing device 140. Live feedback and monitoring may include the user's visual field in real-time, and the visual field includes the superimposed images in real-time, current location, current distance from the desired safe space and current stress state. In the present embodiment, feedback may be transmitted to the computing device 140 until the predictive navigation system 124 has detected the user of the computing device 110 to have arrived at a safe space. Safe spaces, in embodiments, may be predefined by the caregiver, the user, the doctor, therapist, or any other close relative of the user and associated with the user's profile. In other embodiments, safe spaces may be input when the caregiver is first alerted.

In at least one embodiment, the predictive navigation program 124 may then parse through the database 122 to obtain historic artifacts of such location. In such embodiment, the predictive navigation program 124 may utilize the user location data (i.e., user's location data) and further, extract the user current map location (i.e., user current map location). The predictive navigation program 124 may then, in such embodiment, parse through the database 122 to extract historic artifacts of the location of the user. In at least one embodiment, the predictive navigation program 124 may choose artifacts based on locational tags. In other embodiments, the predictive navigation program 124 may input the user current location and extract artifacts in real time from a three-dimensional model of the earth from some previous year.

In at least one embodiment, the predictive navigation program 124 may parse through user's profile history (i.e., user profile history) data to determine the user's age and further, calculate the decade in which the user was a certain age (e.g. a teenager). Subsequently, the predictive navigation program 124 may obtain artifacts from the decade in which the user was of the selected certain age (e.g. a teenager). In other embodiments, the predictive navigation program 124 may extract artifacts from a time period predefined by the computing device 110, 140 (e.g., the patient, caregiver, doctor, family member).

In at least one embodiment, where the predictive navigation program 124 is unable to detect a user profile history, the predictive navigation program 124 may search for and collect historic artifacts from a definitive decade (e.g., the 60s, 70s), a time period a definitive amount of years ago (e.g., 50 years ago), or a randomly selected time period.

In some embodiments, the predictive navigation program 124 may then utilize AR to superimpose the previously derived historic artifacts on the computing device 110 of the user. In some embodiments, the predictive navigation program 124 may superimpose the derived image in a plurality of forms, which may include non-static non-relative (e.g., a moving cat on the sidewalk), non-static relative (e.g., a caterpillar on the hand of the user), static non-relative (e.g., an antique house across the street), or static relative (e.g., a bracelet on the hand of the user).

In at least one embodiment, the predictive navigation program 124 may simultaneously provide turn-by-turn navigation to a safe space of the user. In such embodiment, the defined safe space of the user of the computing device 110 may be the identified home address of the user, found within the user profile data associated with such user in the database 122. In such embodiment, where the prediction navigation program 124 is not able to identify user profile, the predictive navigation program 124 may alert the caretaker (i.e., caregiver) medical professional, therapist, or family member of the computing device 140 that such user of the computing device 110 is beyond the threshold and has no previously defined safe space to return safely to. At this time, the user of the computing device 140 may input data (e.g., an address) to be transferred from the computing device 140 to the server 120, where such input data may then be transferred to the computing device 110. In other embodiments, the predictive navigation program 124 may set the nearest police station (identified by the monitoring unit 112) as the safe space.

In some embodiments, the predictive navigation program 124 may utilize a global positioning system (GPS) to determine the shortest route home for the user. In the present embodiment, once the route has been determined, turn-by-turn navigation steps may be superimposed using AR onto the visual field of the user of the computing device 110. In the present embodiment, turn-by-turn navigation may take the form of superimposed directional images (e.g., arrows) on the surface in which the user should walk (e.g., a sidewalk, crosswalks). In other embodiments, turn-by-turn navigation may be spoken to the user, or written out for the user to read.

In at least one embodiment, the predictive navigation program 124 may superimpose the historic artifacts onto the turn-by-turn navigation instructions. In other embodiments, the predictive navigation program 124 may superimpose the turn-by-turn navigation instructions onto the historic artifacts.

Continuing the previous example, the Caregiver A associated with User A is alerted that the user is extremely stressed, and that the AR system associated with the goggles of User A will commence shortly. At this time, the transmission of live feedback data from the computing device of the User A to the Caregiver A commences. Until the User A reaches the desired safe place, the Caregiver A is able to see on User A's mobile device that User A sees through superimposed images on the AR/VR goggles. The predictive navigation program 124, after commencing live feedback, determines that the User A is at the intersection of $1^{st}$ and $3^{rd}$ street. Further, the predictive navigation program 124 determines that, according to the user profile history associated with User A, the User A is 70 years old and feels most calm when surrounded by an environment that resembles User A's teenager years (i.e., ~1965). The predictive navigation program 124 communicates with the database 122 to receive historic artifacts from 1965 including the static non-relative $1^{st}$ and $3^{rd}$ street signs, the static non-relative sign for the entrance of the once placed drive-through movie theater at the intersection of $1^{st}$ and $3^{rd}$ street, as well as a non-static nonrelative 1965 automobile. Three historic artifacts are superimposed on the visual field of User A using AR goggles. The Caregiver A is also capable of seeing such visual field via the live feedback. Next, the predictive navigation program 124 determines no safe space was found in the user profile history of User A and therefore, locates the nearest police station as the safe space. Directions to the police station are superimposed onto the visual field of the User A, starting with an arrow indicating the user needs to turn right down $1^{st}$ street.

Then, at 210, the predictive navigation program 124 determines if the user is highly stressed. In at least one embodiment, the predictive navigation program 124 may obtain the continuously monitored current stress state of the user, utilizing the same collection method as previously described in 206. In the present embodiment, the predictive navigation program 124 may define highly stress by comparing the current stress state of the user to a stress state threshold. Thresholds may be qualitative (e.g. stress, highly stressed) or quantitative (e.g. a stress scale, ranging from 1 to 10). In other embodiments, the predictive navigation program 124 may compare the initial user stress state and determine the user to be highly stressed if the current stress state of the user is more intensely defined than the initial user stress state (e.g. very stressed being more intense than stressed). In further embodiments, the predictive navigation program 124 may define highly stressed as any unimproved difference between the initial user stress state and the current stress state, which may include, when the initial user stress state and the current stress state of the user are equal.

If the predictive navigation program 124 determines the user is not highly stressed (decision 210 "NO" branch) at 210, the predictive navigation program 124, at 202, re-evaluates the user state and proceeds to decision 204.

If, however, the predictive navigation program 124 determines the user is highly stressed (decision 210 "YES" branch) at 210, the predictive navigation program 124, at 212, activates a VR system. In the present embodiment, upon detection of high stress, the turn-by-turn navigation superimposition may be removed from the visual field of the user. Further, the predictive navigation program 124 may command the user to cease any motion and return to a stationary state. Upon detection of the user is in a stationary state, the virtual reality (VR) system may be activated. In at least one embodiment, the predictive navigation program 124 may utilize VR to present to the user an environment corresponding to a time period with which the user is more familiar. In the present embodiment, the user of the computing device 140 may be able to monitor the stress state of the user in current time by analyzing the live feedback and monitoring transmitted to the computing device 140 via the communication network 102, commenced at 208. In some embodiments, the user of the computing device 140 may be alerted that the stress state of the user has changed. In such embodiments, when the stress state of the user has reduced to normal levels or range for the user, the predictive navigation program 124 may end the VR program and return to the AR turn-by-turn navigation.

In at least one embodiment, the predictive navigation program 124 may parse through the database 122 to obtain historic environments. In such embodiment, the predictive navigation program 124 may utilize the location data of the user and further, may extract the current map location of the user. The predictive navigation program 124 may then, in such embodiments, parse through the database 122 to extract historic environments corresponding to the location derived from the location data of the user. In the present embodiment, the predictive navigation program 124 may chose environments based on locational tags. In other embodiments, the predictive navigation program 124 may input the current location of the user and may extract real-time environments from a three-dimensional model of the earth from some previous year. In the present embodiment, the predictive navigation program 124 may automatically search for and collect environments from the user's teenage decade. In such embodiments, the predictive navigation program 124 may parse through the user profile history data to determine the user's age and further, calculate the decade in which the user was a teenager. According to other embodiments, the predictive navigation program 124 may extract environments from a time period predefined by the computing device 110, 140 (e.g., the patient, caregiver, doctor, family member). In at least one embodiment, where the predictive navigation program 124 is unable to detect a user profile history, the predictive navigation program 124 may search for and may extract environments from a definitive decade (e.g., the 60s, 70s), a time period a definitive amount of years ago (e.g., 50 years ago), or a randomly selected time period.

In the present embodiment, the VR system may be activated by the predictive navigation program 124 for a select period of time before re-evaluating the stress state of the user. In other embodiments, the VR system may be activated until the user of the computing device manually commands the predictive navigation program 124 to re-evaluate the stress state of the user. Manual commands from user, may be in the form of verbal commands recognized by the monitoring unit 112, the push of a button, the swipe of an interface, the flip of a switch, or the turn of a dial. For example, User A may feel relieved after experiencing a historic environment and upon acknowledging the feeling of relief, presses a button that commands the predictive navigation program 124 to re-evaluate stress state of the User A.

Continuing the previous example, the predictive navigation program 124 determines the User A is still extremely perplexed with an even faster heart rate. Additionally, the User A has not moved, another indication of high stress. The predictive navigation program 124 then alerts the Caregiver A that because the User A is still highly stressed the predictive navigation program 124 will run a VR system. At this time, the predictive navigation program 124 obtains the three-dimensional model of the intersection of $1^{st}$ and $3^{rd}$ street and superimposes such environment onto the visual field of the User A. Such model surrounds the User A with all artifacts from 1965 ranging from cars, buildings, street surfaces (e.g. cobblestone), to styles of people from 1965 (e.g. clothing).

Subsequent to activating the VR system, the predictive navigation program 124 may return to determine whether the user is highly stressed, at 210.

Continuing the previous example, the predictive navigation program 124 determines that after 10 minutes of immersing the User A in the VR 1965 three-dimensional environment, the User A is calm. The AR system is then presented again to the user with the previously chosen artifacts (lamppost, entrance sign, motor vehicle) in addition to the turn-by-turn navigation symbols (e.g. arrows on the sidewalk surface). User A follows the turn-by-turn navigation symbols and is detected to have arrived at the police station, at a distance not beyond the comfort boundary of the Caregiver A. The Caregiver A is alerted of the location of User A and live feedback is terminated.

The functionality of a computer may be improved by the predictive navigation program 124 because the predicted navigation program 124 may detect a current location of a user. In response to detecting the current location of the user is beyond a comfort boundary threshold, the predictive navigation program 124 may be able to determine the stress state of the user. Such stress state may be determined after an analysis of data obtained from a plurality of biometric or IoT sensors. The predictive navigation program 124 may further advance current technology by superimposing historic images onto the visual field of a user to reduce the stress state of the user utilizing an AR device. The predictive navigation program 124 may further advance current technology by implementing a VR environment to the visual field of the user upon detection of high stress of the user, especially when the user is affected by a diagnosed medical condition (e.g., anxiety).

It may be appreciated that FIG. 2 provide only an illustration of one embodiment and does not imply any limitations with regard to how different embodiments may be implemented. Many modifications to the depicted embodiment(s) may be made based on design and implementation requirements.

Figure 3:
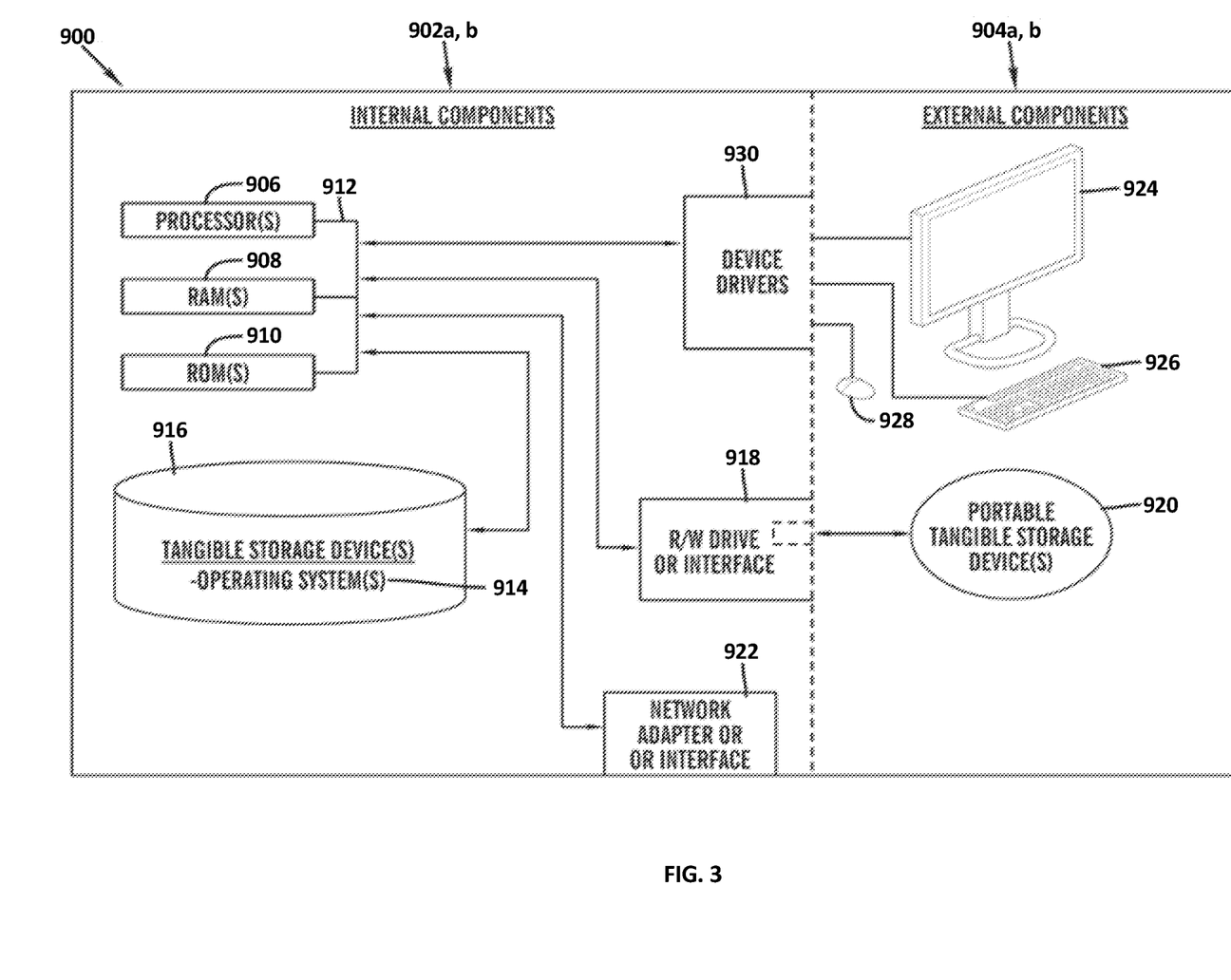
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The communication network 102, the computing device 110, the server 120, and the computing device 140 may include respective sets of internal components 902 a, b and external components 904 a, b illustrated in FIG. 3. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the predictive navigation program 124 on the server 120, and the alert program 142 on the computing device 140, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the predictive navigation program 124 can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The predictive navigation program 124 of the server 120, in addition to the alert program 142 can be downloaded from an external computer (e.g., server) via a network (for example, the Internet, a local area network or other, wide area network) and respective network adapters or interfaces 922. From the network adapters (or switch port adaptors) or interfaces 922, the predictive navigation program 124 of the server 120 and the alert program 142 of the computing device 140 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
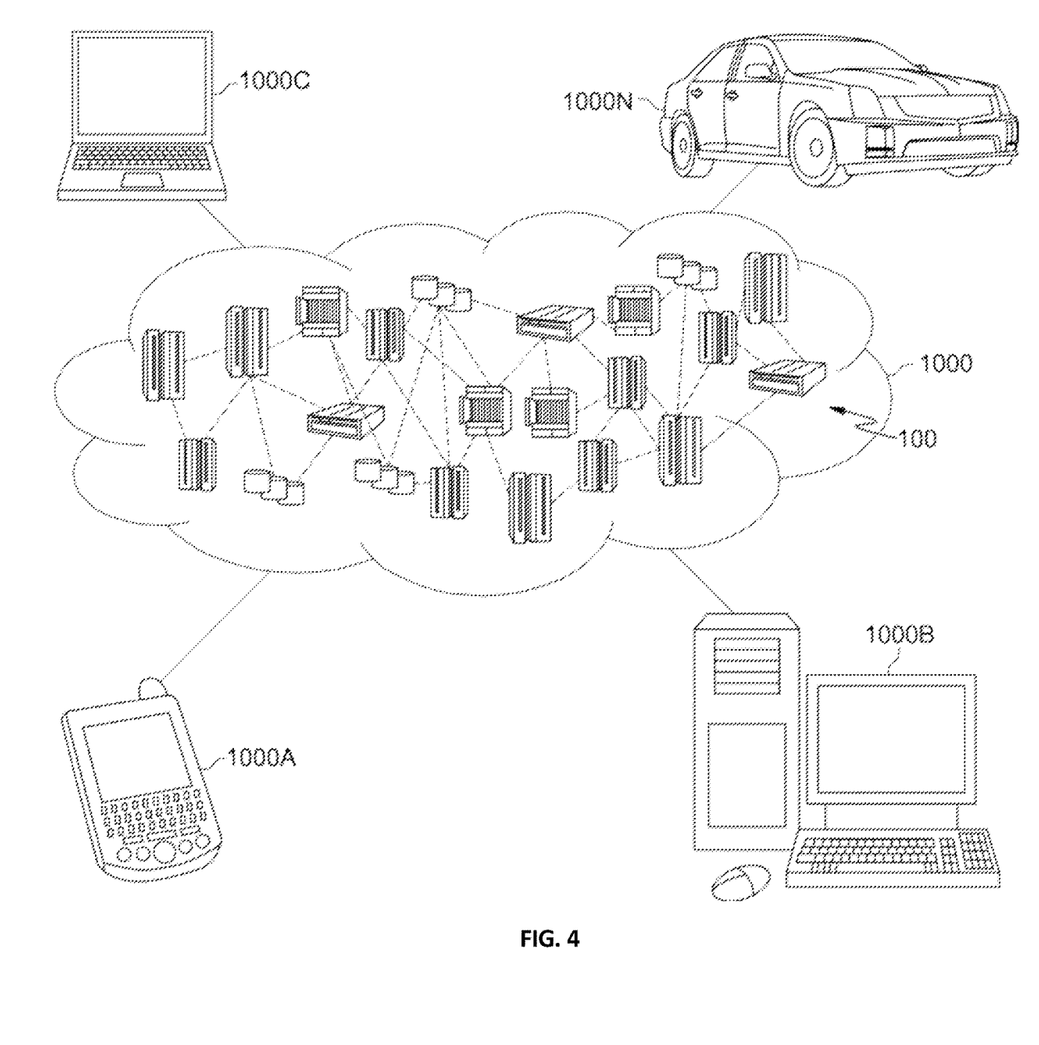
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
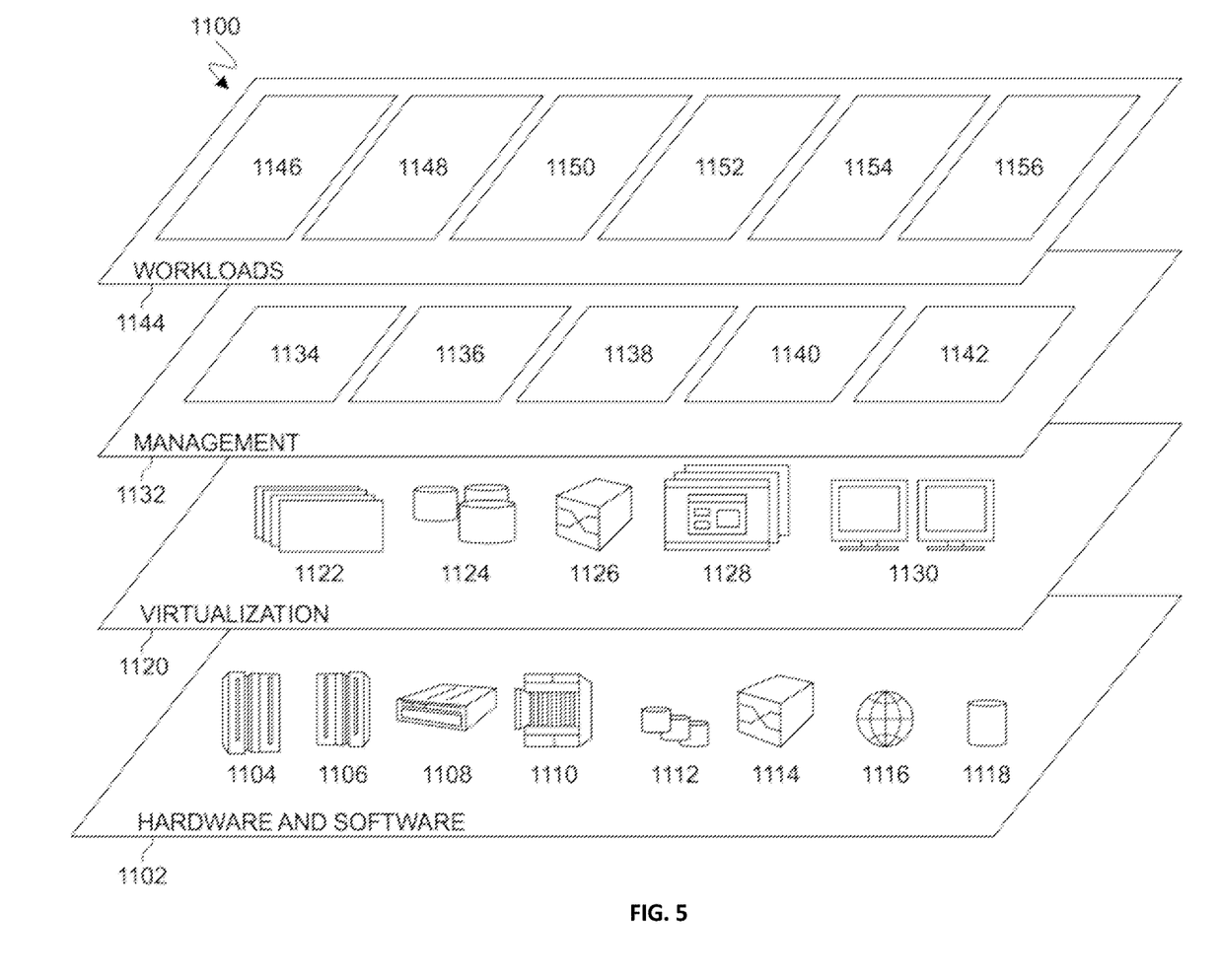
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture-based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and predictive navigation program 1156.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for providing a personalized anxiety-reducing navigation system for a user utilizing augmented reality (AR) and virtual reality (VR), the method comprising:
   detecting a current location of the user;
   in response to detecting the current location of the user is beyond a comfort boundary threshold, determining a stress state of the user;
   activating an AR system; and
   in response to determining that the stress state of the user is high, obtaining a three-dimensional historical representation of the detected current location of the user and superimposing the obtained three-dimensional historical representation of the detected current location onto a visual field associated with the user by utilizing VR.

2. The method of claim 1, wherein detecting the current location of the user, further comprises:
obtaining a piece of feedback data from at least one biometric device and at least one Internet of Things (IoT) sensor.

3. The method of claim 1, further comprising:
determining the comfort boundary threshold based on a history of interactions and a plurality of workflow experiments between the user and a caregiver associated with user.

4. The method of claim 1, wherein activating the AR system, further comprises:
alerting a caregiver associated with the user;
superimposing a plurality of historical images on a visual field associated with the user; and
providing a plurality of navigational directions to the user.

5. The method of claim 4, wherein alerting the caregiver, further comprises:
initiating a continuous feedback for monitoring of the user.

6. The method of claim 4, wherein providing the plurality of navigational directions to the user, further comprises:
superimposing one or more turn-by-turn navigation routes onto the superimposed plurality of historical images on the visual field associated with the user.

7. The method of claim 1, further comprising:
determining the detected stress state of the user is high, wherein the obtained biometric information of the user from at least one biometric device,
wherein the obtained biometric information is compared to a predefined threshold.

8. The method of claim 1, wherein the superimposed three-dimensional historical representation of the detected current location associated with the user calms the patient to a normal stress state.

9. A computer system for providing a personalized anxiety-reducing navigation system for a user utilizing augmented reality (AR) and virtual reality (VR), comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
detecting a current location of the user;
in response to detecting the current location of the user is beyond a comfort boundary threshold, determining a stress state of the user;
activating an AR system; and
in response to determining that the stress state of the user is high, obtaining a three-dimensional historical representation of the detected current location of the user and superimposing the obtained three-dimensional historical representation of the detected current location onto a visual field associated with the user by utilizing VR.

10. The computer system of claim 9, wherein detecting the current location of the user, further comprises:
obtaining a piece of feedback data from at least one biometric device and at least one Internet of Things (IoT) sensor.

11. The computer system of claim 9, further comprising:
determining the comfort boundary threshold based on a history of interactions and a plurality of workflow experiments between the user and a caregiver associated with user.

12. The computer system of claim 9, wherein activating the AR system, further comprises:
alerting a caregiver associated with the user;
superimposing a plurality of historical images on a visual field associated with the user; and
providing a plurality of navigational directions to the user.

13. The computer system of claim 12, wherein alerting the caregiver, further comprises:
initiating a continuous feedback for monitoring of the user.

14. The computer system of claim 12, wherein providing the plurality of navigational directions to the user, further comprises:
superimposing one or more turn-by-turn navigation routes onto the superimposed plurality of historical images on the visual field associated with the user.

15. The computer system of claim 9, further comprising:
determining the detected stress state of the user is high, wherein the obtained biometric information of the user from at least one biometric device,
wherein the obtained biometric information is compared to a predefined threshold.

16. The computer system of claim 9, wherein the superimposed three-dimensional historical representation of the detected current location associated with the user calms the patient to a normal stress state.

17. A computer program product for providing a personalized anxiety-reducing navigation system for a user utilizing augmented reality (AR) and virtual reality (VR), comprising:
one or more computer-readable storage media and program instructions stored on at least one of the one or more tangible storage media, the program instructions executable by a processor to cause the processor to perform a method comprising:
detecting a current location of the user;
in response to detecting the current location of the user is beyond a comfort boundary threshold, determining a stress state of the user;
activating an AR system; and
in response to determining that the stress state of the user is high, obtaining a three-dimensional historical representation of the detected current location of the user and superimposing the obtained three-dimensional historical representation of the detected current location onto a visual field associated with the user by utilizing VR.

18. The computer program product of claim 17, wherein detecting the current location of the user, further comprises:
obtaining a piece of feedback data from at least one biometric device and at least one Internet of Things (IoT) sensor.

* * * * *